Dec. 9, 1952　　　　F. R. EDWARDS　　　　2,620,875
MEASURING APPARATUS
Filed April 2, 1949　　　　　　　　　　2 SHEETS—SHEET 1
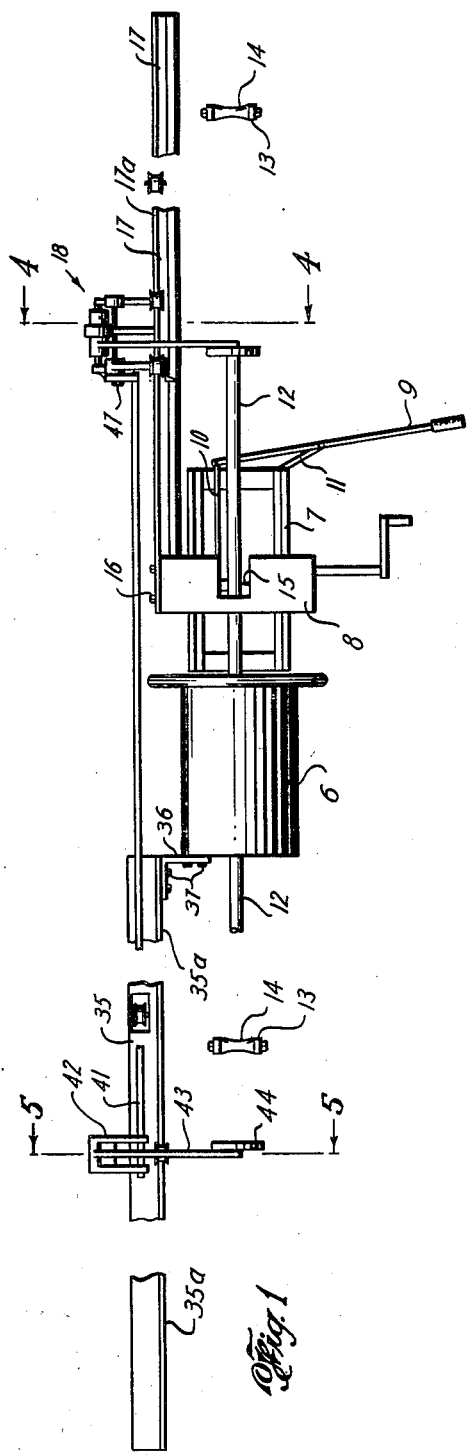
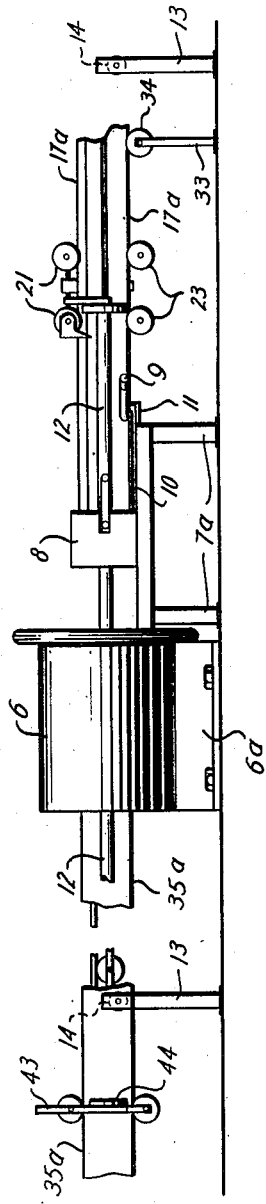
Frederick R. Edwards
INVENTOR
BY Browning & Simms
ATTORNEYS

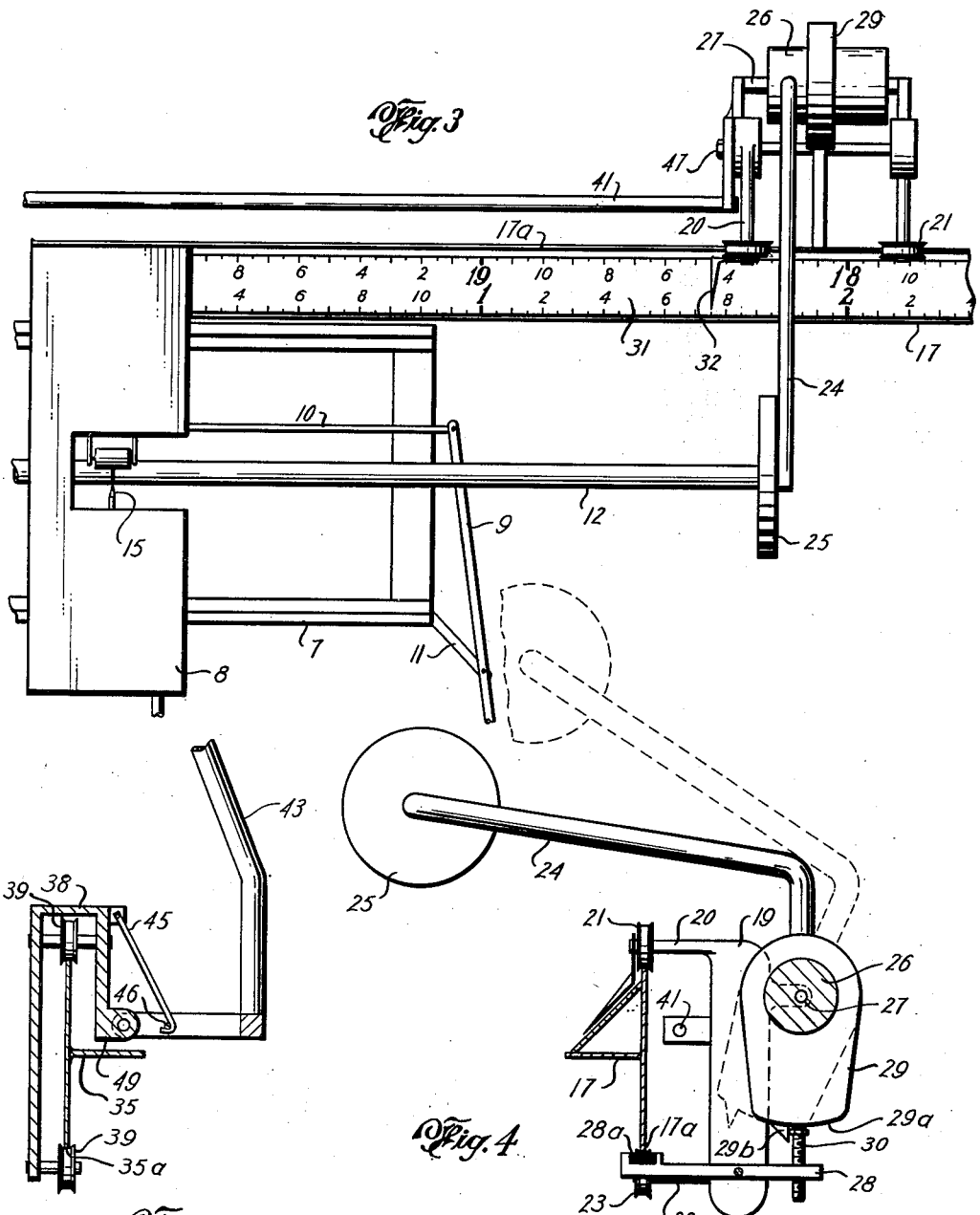

Patented Dec. 9, 1952

2,620,875

UNITED STATES PATENT OFFICE 2,620,875

MEASURING APPARATUS

Frederick R. Edwards, Houston, Tex.

Application April 2, 1949, Serial No. 85,243

14 Claims. (Cl. 164—59)

This invention relates to improvements in measuring apparatus and refers more particularly to measuring means adapted for use in conjunction with machines for fashioning pipe, rod and the like such as machines for cutting, reaming and threading pipe and to such machines complete with such measuring means.

Heretofore, in the operation of machines for fashioning pipe, rod and the like such as, for example, those used for cutting, reaming and threading pipe, it has been necessary to manually measure a length of work piece with a rule or scale separate from the machine and mark the work piece at the appropriate place with chalk or the like. This method, at best, is time-consuming and troublesome and in the usual course of operation, proves to be very inaccurate. For instance, in measuring pipe in the conventional manner, the operator may by error set the pipe in the machine to be cut at the wrong mark. When operating under adverse conditions, actual rule measurements are frequently inaccurate. Also, extreme care must be exercised to place the right mark in exact position relative to the work tool carried by the machine in order to work on the pipe at the correct place.

It is the increasing present day tendency in construction work to pre-cut, ream and thread all pipe to be used on an individual job or a plurality of associated jobs in large scale housing operations and the like. By this manner, all of the pipe to be used on a job may be worked up, carried to the location of installation and then installed in a workmanlike efficient manner. With pipe worked up in accordance with the conventional manner and method, difficulty has often been experienced in that the small inaccuracies in the cutting and other working of the pipe has prevented its proper installation without further work on the job.

An object of this invention is to provide a machine for fashioning pipe, rod or the like wherein the work piece may be efficiently fashioned in accordance with exact measurements at a high output rate for each machine.

Another object is to provide a machine for fashioning pipe, rod or the like wherein a work piece may be worked upon at varied lengths in accordance with exact measurements.

A further object is to provide a machine for fashioning pipe, rod or the like wherein the measurement of the work piece to determine the position thereon of the work to be performed is governed by stop means carried by the machine eliminating the usual marking of the work piece with a rule or the like with the subsequent necessity for exact positioning of the mark relative to a working tool of the machine.

Still another object is to provide a machine for fashioning pipe, rod or the like wherein parts carried by the machine including the work tool itself are placed in a predetermined measured relationship and the work piece is then placed between these parts to effect a working thereon in accordance with exact measurements.

A still further object is to provide in a pipe working machine means which will indicate to the operator the measurements of the pipe last cut or worked on in order that the operator may readily determine that part of the bill of goods which has yet to be worked up.

Yet another object is to provide measuring means for pipe working machines having a stop part mounted to move simultaneously with the ordinary to and fro movement of the tool carrier of such machines whereby movement of the carrier, in successive working operations does not disturb the measurement setting of the machine.

Yet a further object of the invention is to provide a pipe working machine wherein two measuring stops may be adjusted individually in selected positions relative to the work tool carrier, one of the stops facilitating measurement of short lengths of pipe and the other stop facilitating measurement of long lengths of pipe.

Even another object is to provide in a pipe working machine means for measuring that portion of the pipe extending from either end of the machine.

Even a further object is to provide in a pipe working machine two measuring stops which may be individually positioned to engage the end of a pipe and secured in a predetermined position relative to the work tool carrier wherein manipulation of one of the stops operates a releasable detent to secure both of the stops in a predetermined position.

Another object is to provide a pipe working machine with measuring means of the character described which is portable or may be set up in a permanent or semi-permanent installation.

A further object is to provide pipe measuring means which may be releasably secured to a standard pipe cutting machine.

Still another object is to provide pipe measuring means of the character described having a double stop facilitating measurement of long and short lengths of pipe wherein one of the stops is operable, upon manipulation, to operate a detent means for securing the stops individually in predetermined positions relative to a tool carrier of the machine wherein the detent actuating stop locks the detent when in one out-of-the-way position and when in position to be engaged by a pipe end and wherein the other stop may be moved to either an out-of-the-way position or an operative position.

Other and further objects of the invention will appear from the description.

This invention, in general, is concerned with work to be done on pipes or the like at exact positions along their length as, for instance, in the cutting of pipe. In most operations of this character, it is necessary to perform other operations as, for instance, reaming and threading the cut end of the pipe. It is desirable that these operations be carried out successively, and this is the accepted practice.

In accordance with this invention, the work piece is actually measured by parts carried by the machine, one of which is the work tool itself. Expressed differently, a measuring stop is supported by the usual work tool carrier of a pipe working machine, and this stop may be secured in a predetermined position relative to the work tool. Thus, when the pipe to be worked upon is placed in proper position within the machine with one end abutting the stop part, the work may be performed without adjusting the position of the work tool carrier upon the ways of the machine. The measuring means may be made up as an integral part of the machine or may be such as to be releasably attached thereto. Preferably two individually operated stop parts are provided to facilitate working upon pipes over a large range of lengths with a single detent means for releasably securing either of the stops in a selected position shown by a single indicator.

In the accompanying drawings, which form a part of the instant specification, are to be read in conjunction therewith, and wherein like reference numerals are used to indicate like parts in the various views:

Fig. 1 is a schematic top plan view of a pipe working machine embodying this invention, Fig. 2 is a side elevation of the machine shown in Fig. 1, Fig. 3 is a top plan fragmentary view, upon an enlarged scale, illustrating one of the measuring steps of the machine shown in Fig. 1, Fig. 4 is a view upon an enlarged scale taken along the line 4—4 in Fig. 1 in the direction of the arrows, and Fig. 5 is a view upon an enlarged scale taken along the line 5—5 in Fig. 1 in the direction of the arrows.

The actual pipe working machine may be any standard machine and therefore, in the interest of simplicity, the machine has been shown schematically and a detailed description of its parts will be dispensed with. Referring to Figs. 1 and 2, a standard machine for cutting, reaming and threading pipe is shown. However, it is to be understood that the invention is applicable to machines for fashioning pipe, rod and the like generally. Housing 6 with a suitable support mounting 6a carries the usual rotatably mounted gripping means for positioning a work piece such as a collet. Extending in front of the housing 6 are the ways 7 mounted on uprights 7a on which the tool carrier 8 is mounted for to and fro movement relative to housing 6. This to and fro movement is facilitated by manipulation of lever 9 having pivotal connection with the carrier and the ways or support of the machine through links 10 and 11, respectively, all of which is conventional.

The pipe 12, to be worked on in the machine, extends through housing 6 and carrier 8 and from both ends of the machine. Where desired, stanchions 13 may be provided for mounting rollers 14 to support the pipe along its length. The work tool, such as cutter tool 15, is supported by carrier 8 which, it will be recalled, is movably mounted on ways 7. Due to this mounting of the carrier, the measuring means of this invention include a portion which is supported by the carrier and preferably is releasably secured thereto as by bolts 16. This portion includes a support 17 which provides a double track rail 17a. The support 17 is an elongate member, having a length of usually about one-half the maximum pipe length to be measured in the machine. Due to its length, it is desirable to provide a moving support for the member 17 as provided by stanchions 33 with rollers 34 mounted thereon and engageable with the lower rail 17a. The stanchions may be permanently or removably mounted as meets the requirements of the installation.

A suitable stop means, indicated generally at 18, is mounted for to and fro movement on support rail 17a. The stop means may include a carrier frame 19 having two extending axle arms 20 for supporting top wheels 21 and two lower arms 22 for supporting the lower wheels 23. The wheels are adapted to move along the rails 17a. The frame carries a pivotally mounted arm or stop member 24 having a part or plate 25 adapted to be moved into position to be engaged by one end of pipe or work piece 12 to be worked on as shown in Figs. 1, 2 and 3. This stop arm preferably is mounted upon frame 19 in a manner to provide for movement of the arm into an out-of-the-way position to be engaged by the work piece or, stated differently, into and out of axial alignment with the gripping means for positioning the work piece and the tool carrier. This may be accomplished by providing a pivotal mounting of the stop arm on the frame. In the preferred embodiment, arm 24 is secured to a sleeve 26 which is journaled on a pivot pin 27 carried by the frame 19.

A detent or latch means is provided to secure the stop means in a predetermined position along the support 17. Preferably, this stop means includes the stop arm 24 as the operating lever. This may be accomplished by pivotally mounting a friction bar 28 on frame 19, the bar having a friction element 28a at one end adapted to be moved into frictional engagement with one of the rails 17a when the other end of the arm is depressed. The actuating connection between bar 28 and arm 24 includes a cam 29 keyed to sleeve 26 for rotation therewith. The lower end of the cam surface shown at 29a is struck on a radius about pivot 27 and is adapted to engage the upper end of an adjustable set screw 30 carried by bar 28. The stop 29b may be provided on the cam surface to engage the set screw 30 and arrest movement of arm 24 in such position that plate 25 is engageable by a pipe to be worked on. The remainder of the peripheral cam surface is a lesser distance from pivot pin 27 whereby movement of the arm in an upper direction will release the frictional engagement of the detent element 28 with support 17 when cam surface 29a is moved off the head of screw 30.

Where a plurality of stops are to be employed on a single machine to facilitate measurement of pipe lengths over a large range, or pertaining to a plurality of work tools or both, it is desirable that the cam surface 29a have sufficient length to actuate the detent while plate 25 is still in an out-of-the-way position as shown in dotted lines in Fig. 4. This will secure the stop means in a predetermined position relative to the cutting tool and yet permit the movement of the work piece 12 past plate 25.

An indicating means to facilitate setting of the stop means in predetermined positions may be mounted on support 17 as shown by a calibrated rule 31. Indicator or pointer 32 may be secured to the stop means and preferably is in a position so that its view is not obstructed by stop member 24 or plate member 25. When the pointer is secured to one of the axle parts 20, as shown in Fig. 3, it may be readily viewed. The pointer and scale are arranged so that the pointer indicates the actual distance from the abutment face of plate 25 to the work tool such as cutter 15. With this arrangement, when work piece 12 is arranged in the machine so that one end engages plate 25, the indicator shows the exact length of the section of the work piece between the plate and the cutter tool which will be the length of the severed work piece. As will be seen the rule 31 contains two scales and the lowermost of these scales is the one that indicates the position of plate 25 relative to the work tool.

It is contemplated that where the apparatus is to be used in conjunction with a carrier 8 having more than one work tool for working a pipe at predetermined positions along its length, a plurality of such scales may be employed indicating the distance from the abutment face of plate 25 to the various work tools.

As heretofore indicated, it is usually desirable to provide a plurality of stop parts to increase the variety of lengths of pipe that may be fashioned by the machine and still make it readily operable by the operator. While the second stop may be to the right of the first, it is preferable to mount it on the left hand side of the pipe working machine. This second stop is for use only in measuring long lengths of pipe so that the position of housing 6 intermediate the stop and the work tool does not interfere with proper functioning of the device. This makes it possible to measure and work on the long lengths of pipe taking into account the portion of the pipe extending to the left of the machine.

A support 35 is removably mounted by angle iron 36 and studs 37 to the housing 6. This member 35 has a stationary mounting, any suitable stanchion or temporary piling may be employed adjacent the left end of the device for supporting it.

Support member 35 has upper and lower rail portions 35a on which the second stop part is movably mounted. The second stop part or means includes a frame 38 to which wheels 39 are mounted so as to engage the rails 35a. Frame 38 has an ear 49 which is secured to a pull bar 41. The pull bar provides a pivot mounting for yoke 42 of the second stop arm 43. A stop part or plate 44 is secured to arm 43 and is adapted to be secured in position to become engaged by one end of a pipe to be cut by engagement of the yoke with the frame 38. The arm 43 may be swung to an out-of-the-way position as shown in Fig. 5 in which position it is retained by engagement of hook 45 secured to frame 38, with pin 46 carried by the yoke. The arrangement is such that with the arm in Fig. 5 position, the center of gravity of the device is to the right of a vertical plane including the axis of the pivot.

The pull bar 41 connects between stop means 18, where it is connected to frame 19 by bolt 47 and the second stop means. Thus, movement of the stop means 18 will move the second stop means and the uppermost calibration of scale 31 is arranged to diminish as it progresses to the right so that pointer 32, when taken in conjunction with this calibration, indicates the distance between work tool or cutter 15 and the abutment face of plate 44. It is contemplated that in some installations it may be desirable to provide an operating lever adjacent the carrier 8, connected with arm 43, to swing it into and out of stop position, but for most purposes, this is not required and for this reason, this has not been shown in the drawings.

It is believed that the operation of the invention is apparent from the foregoing description. The measuring means of the invention may be formed as an integral part of a machine for fashioning pipe, rod or the like, or as a releasable attachment for use in conjunction with conventional machines of this type. When in the latter form, it is readily secured to the machine or released therefrom merely by manipulation of bolts 16 and 37. When desired, bolt 47 may be released to further break down the pipe measuring means to facilitate its transportation, storage or the like.

In describing the operation of the machine, it will be assumed that the work piece is a pipe 12 extending through housing 6 and carrier 8. The gripping means of housing 6 are released and if a short length of pipe is to be cut, stop means 18 is adjusted so that pointer 32 indicates the length of pipe desired. In the Fig. 3 setting, for instance, the pipe length to be cut would be 1' 7½". Arm 24 is then moved to its lowest working position with stop 29b engaging screw 30. This movement actuates the detent bar 28 to releasably secure stop means 18 in a predetermined position relative to the work tool 15. Pipe 12 is then adjusted in the machine until its right end engages plate 25. The pipe gripping means of housing 6 are then engaged in accordance with normal practice, tool 15 is brought into operative position relative to pipe 12 and the pipe is rotated to sever a pipe length of exactly 1' 7½".

In accordance with the usual practice, it is then desirable to ream the right hand end of the pipe remaining in the machine. This requires a movement of carrier 8 along the ways, to the right to permit the reaming tool, not shown in the drawings, to be placed in operative position all in accordance with the conventional practice as will be well understood by those skilled in the art. If desired, carrier 8 can then be moved along the ways to bring a threading tool, not shown in the drawings, into engagement with the right hand end of pipe 12 to thread the reamed end of the pipe.

If another pipe length of exactly 1' 7½" is desired, the pipe gripping means of housing 6 are released and the pipe manually is pushed or pulled to the right until the end that has just been threaded engages plate 25. Regardless of the present position of carrier 8 on ways 7, another cutting operation will sever a length of pipe at exactly the required measurement. If the next piece of pipe to be cut or otherwise worked on is to have a different length from its right hand end to the point of working, arm 24 is raised to release the detent, stop means 18 is adjusted to a new position, and the arm again is swung to operative stopping or measuring position. The operation can then be repeated as described above.

During the cutting of pipe from the right hand end of the section 12, stop arm 43 may be in its raised or out-of-the-way position. If it is then desired to cut a long length of pipe, stop arm 43 is swung to operative measuring position and stop arm 24 is actuated to secure stop means 18 in a position with pointer 32 residing at a point along the upper calibration of scale 31 denoting the desired length of pipe. In Fig. 3, this would be a pipe length of 18' 4½". Arm 24 is then moved downwardly to the position shown in dotted lines in Fig. 4. This position causes an engagement of the latch or detent means to secure both stop means against movement relative to the carrier 8 but leaves plate 25 in an out-of-the-way position so as not to interfere with axial movement of pipe 12. Pipe 12 is then adjusted to bring its left hand end into engagement with plate 44. In this position, when the cutter tool is operated in the conventional manner, the pipe extending from the left of the cutter tool 15 will be exactly of the length desired.

As many lengths of pipe of this dimension may be severed as desired without resetting the tool and any movement of the carrier 8 on ways 7, as occasioned by reaming, threading or other operations, will not disturb the setting of the stop means.

After a piece of pipe has been cut from pipe 12, the indicator 32 will always remind the operator of the length of the last piece cut until the operator changes the position of the stop means. Thus, when cutting operations are interrupted for any cause, the operator is accurately reminded of the length of the past pipe cut and by referring to the work bill, can determine the length of the next pipe to be cut. This reduces the likelihood of omission of one or more parts of the work bill.

It will be seen that the objects of this invention have been accomplished. There has been provided a pipe working machine with a means for accurately measuring the position of one end of the pipe to be worked upon and the working tool. The arrangement is such that the measurements are performed directly by a setting of machine parts eliminating the necessity for marking pipe and then adjusting the position of the work tool accurately in relation to such marks. The construction is such that the machine may be readily disassembled for transportation to another location and there reassembled, or the installation may be of a permanent or semi-permanent character. The machine of this invention is easily operated and although a plurality of stop means may be employed to facilitate a variety of measurement settings over a large range, a single indicator which remains reasonably accessible to the normal tool carrier of the machine indicates the setting of each stop. In addition, a given setting may be employed for working upon pipe at a given length successively without necessitating resetting of the measuring means although the tool carrier is moved along its ways in order to accommodate successive work operations of a different character.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a lathe type machine for fashioning pipe, rod or the like having a rotatable gripping means for positioning a work piece and a work tool carrier mounted for to and fro movement relative thereto, the improvement which resides in the combination therewith of a work piece measuring mechanism including an elongate scale mounted for to and fro movement with the carrier and extending therefrom in the line of its travel, a stop member movable along the scale from immediately adjacent the carrier to the end of the scale and releasably securable in a selected position therealong, said stop member having a part, when anchored, adapted to be engaged by one end of a work piece to be fashioned.

2. In a machine for fashioning pipe, rod and the like a rotatably mounted gripping means for positioning a work piece, a tool carrier conventionally mounted for to and fro movement relative thereto, stop means mounted for movement with the carrier including two parts mounted for independent movement into and out of aligned position with the axis of rotation of the gripping means in selected positions relative to a work tool supported by the carrier, one of the parts being normally spaced further from the carrier than the other part, the parts being positioned with the carrier and gripping means therebetween.

3. In a machine for fashioning pipe, rod and the like a rotatably mounted gripping means for positioning a work piece, a tool carrier conventionally mounted for to and fro movement relative thereto, stop means mounted for movement with the carrier including two parts mounted for independent movement into and out of aligned position with the axis of rotation of the gripping means in selected positions relative to a work tool supported by the carrier, said parts being connected together and mounted for movement to and fro relative to the carrier, a single latch means adapted to lock the parts in selected positions relative to the carrier.

4. In a machine for fashioning pipe, rod and the like a rotatably mounted gripping means for positioning a work piece, a tool carrier conventionally mounted for to and fro movement relative thereto, stop means mounted for movement with the carrier including two parts mounted for independent movement into and out of aligned position with the axis of rotation of the gripping means in selected positions relative to a work tool supported by the carrier, said parts being connected together and mounted for movement to and fro relative to the carrier, a single latch means adapted to lock the parts in selected positions relative to the carrier and a single indicator operable upon two scales to indicate the distance between a tool supported by the carrier and each of the parts.

5. In a machine for fashioning pipe, rod and the like a rotatably mounted gripping means for positioning a work piece, a tool carrier conventionally mounted for to and fro movement relative thereto, stop means mounted for movement with the carrier including two parts mounted for independent movement into and out of aligned position with the axis of rotation of the gripping means in selected positions relative to a work tool supported by the carrier, said parts being connected together and mounted for movement to and fro relative to the carrier, a single latch means adapted to lock the parts in selected positions relative to the carrier, one of said parts comprising the actuating lever for the latch means and adapted to engage the latch when in operative work piece stopping position and also when in one out-of-the-way position but to release the latch when placed in another out-of-the-way position.

6. A work piece measuring attachment adaptable for use in conjunction with lathe type machines for fashioning pipe, rod and the like comprising a support connectable with the usual movable tool carrier of the machine for to and fro movement therewith, a stop member mounted upon said support for movement therealong and for transverse movement into and out of position to be engaged by the end of a work piece in operation, and detent means adapted to releasably secure the stop member in a selected position along the support, said member having a part engageable by one end of a work piece in operation, said detent means including an actuator part carried by the stop member and movable upon transverse movement of the stop member to stop position to actuate the detent means and to release same upon reverse transverse movement of the stop member.

7. The combination of claim 6 wherein a scale is carried by the support and an indicator carried by the stop member indicates the position of the part engageable by a work piece relative to a work tool of the machine for which the attachment is adapted for use.

8. A pipe measuring attachment adaptable for use in conjunction with lathe type pipe working machines, comprising support means releasably connectable to a pipe working machine with a portion mountable on the tool carrier of such machine for movement therewith, a stop means movably mounted upon said support portion, detent means for releasably securing the stop means in a selected position along the support, said stop means including two spaced apart members each mounted for movement independently of the other into and out of position to be engaged by an end of a pipe when in operation, a scale carried by the support portion and a single indicator carried by the stop means cooperable with the scale to indicate the position of both stop members relative to a work tool of a machine to which the attachment may be secured.

9. In a lathe type machine for fashioning pipe, rod and the like, a rotatable gripping means for positioning a work piece, a work tool carrier conventionally mounted for to and fro movement relative thereto, stop means connected to the carrier for movement therewith having a stop part adapted to be releasably secured in a selected position relative to a work tool supported by the carrier where the stop part is engageable by one end of the work piece to be fashioned in the machine, the stop part engageable by the work piece being movable to an out-of-the-way position relative to a work piece to be fashioned, said means for releasably securing the stop part engageable by a work piece in stop position including a detent having an actuator part connected to said stop part and adapted to be actuated to secure the stop means by moving the stop part into stop position and to release the stop means by movement of the part into an out-of-the-way position.

10. A work piece measuring attachment adaptable for use in conjunction with lathe type machines for fashioning pipe, rod and the like, comprising a support connectable with the usual movable tool carrier of the machine for to and fro movement therewith, a stop member movably mounted upon said support and movable laterally into stop position where the member is engageable by one end of a work piece to be fashioned and out of stop position at any location along the support, and detent means including an actuator part carried by the stop member adapted to releasably secure the stop member in a selected position along the support, said member providing an actuating arm for the detent means to actuate said detent means upon movement of the stop member toward stop position and to release same by movement of the stop member toward out-of-the-way position.

11. In a lathe type machine for fashioning pipe, rod and the like, having a rotatable gripping means for positioning a work piece and a work tool carrier mounted for to and fro movement relative thereto, the improvement which resides in the combination therewith of an elongate support means mounted on the carrier for to and fro movement therewith and extending parallel to the carrier's path of travel, a stop member mounted for movement along the support means, said latter mounting providing for swinging movement of the stop member into and out of stop position in alignment with the axis of rotation of the gripping means at any selected position along the support means, and cam detent means operable upon movement of the stop member toward stop position for anchoring the stop member in any selected stop position.

12. A pipe measuring attachment adaptable for use in conjunction with lathe type pipe working machines, comprising support means releasably connectable to a pipe working machine with a portion mountable on the tool carrier of such machine for movement therewith, a stop means movably mounted upon said support portion, detent means for releasably securing the stop means in a selected position along the support, said stop means including two spaced apart members each adapted to be moved into and out of position to be engaged by an end of a pipe when in operation, one of said stop members being connected with the detent means and providing the actuator therefor, a scale carried by the support portion and a single indicator carried by the stop means co-operable with the scale to indicate the position of both stop members relative to a work tool of a machine to which the attachment may be secured.

13. A pipe measuring attachment adaptable for use in conjunction with lathe type pipe working machines, comprising support means releasably connectable to a pipe working machine with a portion mountable on the tool carrier of such machine for movement therewith, a stop means movably mounted upon said support portion, detent means for releasably securing the stop means in a selected position along the support, said stop means including two spaced apart members each adapted to be moved into and out of position to be engaged by an end of a pipe when in operation, one of said stop members being connected with the detent means and providing the actuator therefor, said detent being engaged when such stop member is in position to be contacted by a pipe and when in one out-of-the-way position and to be released when such stop member is in another out-of-the-way position, a scale carried by the support portion and a single indicator carried by the stop means co-operable with the scale to indicate the position of both stop members relative to a work tool of a machine to which the attachment may be secured.

14. A work piece measuring attachment adapted for use in conjunction with lathe type machines for fashioning pipe, rod and the like comprising, a track movably mounted for to and fro movement with the usual movable tool carrier of the machine, stop means mounted on said track for to and fro movement relative to said tool carrier, a detent carried by said stop means having a part adapted to engage said track to secure the stop means against movement relative to said track, a stop arm mounted on said stop means for a lateral movement with reference to said track, a stop part carried by said stop arm, said detent including a cam part carried by the stop arm and movable upon transverse movement of the stop arm into a position such that the stop part will be engaged by a work piece in operation to actuate the detent means and to release same upon reverse transverse movement of the stop member.

FREDERICK R. EDWARDS.

REFERENCES CITED

The following references are of record in the file of this patent:

UNITED STATES PATENTS

| Number | Name | Date |
|---|---|---|
| 969,858 | Hamilton | Sept. 13, 1910 |
| 1,415,099 | Kohler | May 9, 1922 |
| 1,516,168 | Wenk | Nov. 18, 1924 |
| 1,930,295 | VonHenke | Oct. 10, 1933 |
| 1,936,331 | Lawson | Nov. 21, 1933 |
| 2,205,389 | Borzym | June 25, 1940 |
| 2,261,214 | Bierman | Nov. 4, 1941 |
| 2,325,431 | Shipy | July 27, 1943 |